United States Patent
Chalfin et al.

(10) Patent No.: US 8,046,698 B1
(45) Date of Patent: Oct. 25, 2011

(54) SYSTEM AND METHOD FOR PROVIDING COLLABORATION OF A GRAPHICS SESSION

(75) Inventors: Alex Chalfin, Mountainview, CA (US); Younghee Lee, Sunnyvale, CA (US); Ryan Smith, Sunnyvale, CA (US)

(73) Assignee: Graphics Properties Holdings, Inc., New Rochelle, NY (US)

( * ) Notice: Subject to any disclaimer, the term of this patent is extended or adjusted under 35 U.S.C. 154(b) by 560 days.

(21) Appl. No.: 10/112,366

(22) Filed: Mar. 29, 2002

(51) Int. Cl.
*G06F 3/00* (2006.01)

(52) U.S. Cl. ........ 715/751; 715/740; 715/733; 715/741; 715/744; 715/748

(58) Field of Classification Search .......... 345/751–758; 709/204, 205, 206; 571/751–758; 715/751, 715/753 M, 754, 755, 756, 757, 758, 740, 715/733, 741, 744, 748, 752
See application file for complete search history.

(56) References Cited

U.S. PATENT DOCUMENTS

| | | | | |
|---|---|---|---|---|
| 5,446,842 | A | * | 8/1995 | Schaeffer et al. ............. 709/205 |
| 5,557,725 | A | * | 9/1996 | Ansberry et al. ............. 345/755 |
| 5,689,800 | A | | 11/1997 | Downs |
| 5,727,135 | A | * | 3/1998 | Webb et al. .................. 358/1.14 |
| 6,049,334 | A | * | 4/2000 | Bates et al. .................... 345/755 |
| 6,139,197 | A | | 10/2000 | Banks |
| 6,335,739 | B1 | * | 1/2002 | Matsukura et al. ........... 345/755 |
| 6,343,313 | B1 | * | 1/2002 | Salesky et al. ................ 709/204 |
| 6,608,636 | B1 | * | 8/2003 | Roseman ....................... 715/753 |
| 7,237,004 | B2 | * | 6/2007 | Slobodin et al. .............. 709/204 |
| 2003/0018719 | A1 | * | 1/2003 | Ruths et al. ................... 709/205 |

OTHER PUBLICATIONS

"What is VNC? A practical introduction" VNC—Virtual Network Computing from AT&T Laboratories Cambridge; http://www.uk.research.att.com/vnc/; 2 unnumbered pages.
"Interoperable Conferencing and Application Sharing", SGImeeting 2.0 (IRIX 6.5.2 or later) SGI Products—Software : SGImeeting; http://www.sgi.com/software/sgimeeting/, 6 pages; Jul. 15, 2001.

* cited by examiner

*Primary Examiner* — Weilun Lo
*Assistant Examiner* — Mylinh Tran
(74) *Attorney, Agent, or Firm* — Baker Botts L.L.P.

(57) ABSTRACT

A visual server system (10) includes a visual server (12) that provides graphics images through execution of a graphics application (20). A local terminal (16) may interact with the graphics application (20) through a server application (30) in response to possession of input control. A remote client terminal (14) may interact with the graphics application (20) through a session application (22) in response to possession of the input control. The input control is passed between the local terminal (16) and the remote client terminal (14) in order to provide collaboration of a graphics session. The local terminal (16) and the remote client terminal (14) receive the same view of the graphics application (20). Interactions with the graphics application (20) performed by either the local terminal (16) or the remote client terminal (14) are viewable by the other terminal. Interactions with the graphics application (20) by either the local terminal (16) or the remote client terminal (14) that does not have the input control are blocked.

12 Claims, 3 Drawing Sheets

8,046,698 B1

SYSTEM AND METHOD FOR PROVIDING COLLABORATION OF A GRAPHICS SESSION

TECHNICAL FIELD OF THE INVENTION

The present invention relates in general to computer system and network technology and more particularly to a system and method for providing collaboration of a graphics session.

BACKGROUND OF THE INVENTION

Currently, visual systems have a limitation that a graphics pipeline assigned to a user cannot be shared with other users since the system allocates a graphics pipeline to a session from unmanaged graphics pipelines in the system. Without the ability to have a session with more than one user, there is no ability to have collaboration between multiple users. In networks where multiple users can see the graphics images, there is no window system information or user interaction capabilities. Moreover, mere graphics primitives are provided to the multiple users as opposed to rendered images. Where rendered images may be provided, there is no support for hardware accelerated graphics. Therefore, it is desirable to provide an interactive capability for users to rendered images with hardware accelerated graphics support.

SUMMARY OF THE INVENTION

From the foregoing, it may be appreciated by those skilled in the art that a need has arisen for remote users to share and interact with an executing graphics application. In accordance with the present invention, a system and method for providing collaboration of a graphics session are provided that substantially eliminate or greatly reduce disadvantages and problems associated with conventional computer interaction techniques.

According to an embodiment of the present invention, there is provided a system for providing collaboration of a graphics session that includes a visual server providing graphics images through execution of a graphics application. A local user station interacts with the graphics application in response to possession of input control. A remote client may also interact with the graphics application in response to possession of the input control. The input control can be passed between the local terminal and the remote terminal.

The present invention provides various technical advantages over conventional computer interaction techniques. For example, one technical advantage is to provide identical views of a graphic application to both a local terminal and a remote terminal. Another technical advantage is to establish a collaborative session with a graphics application between a local terminal and a remote terminal. Yet another technical advantage is to use input control to permit interactions with a shared graphics application. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
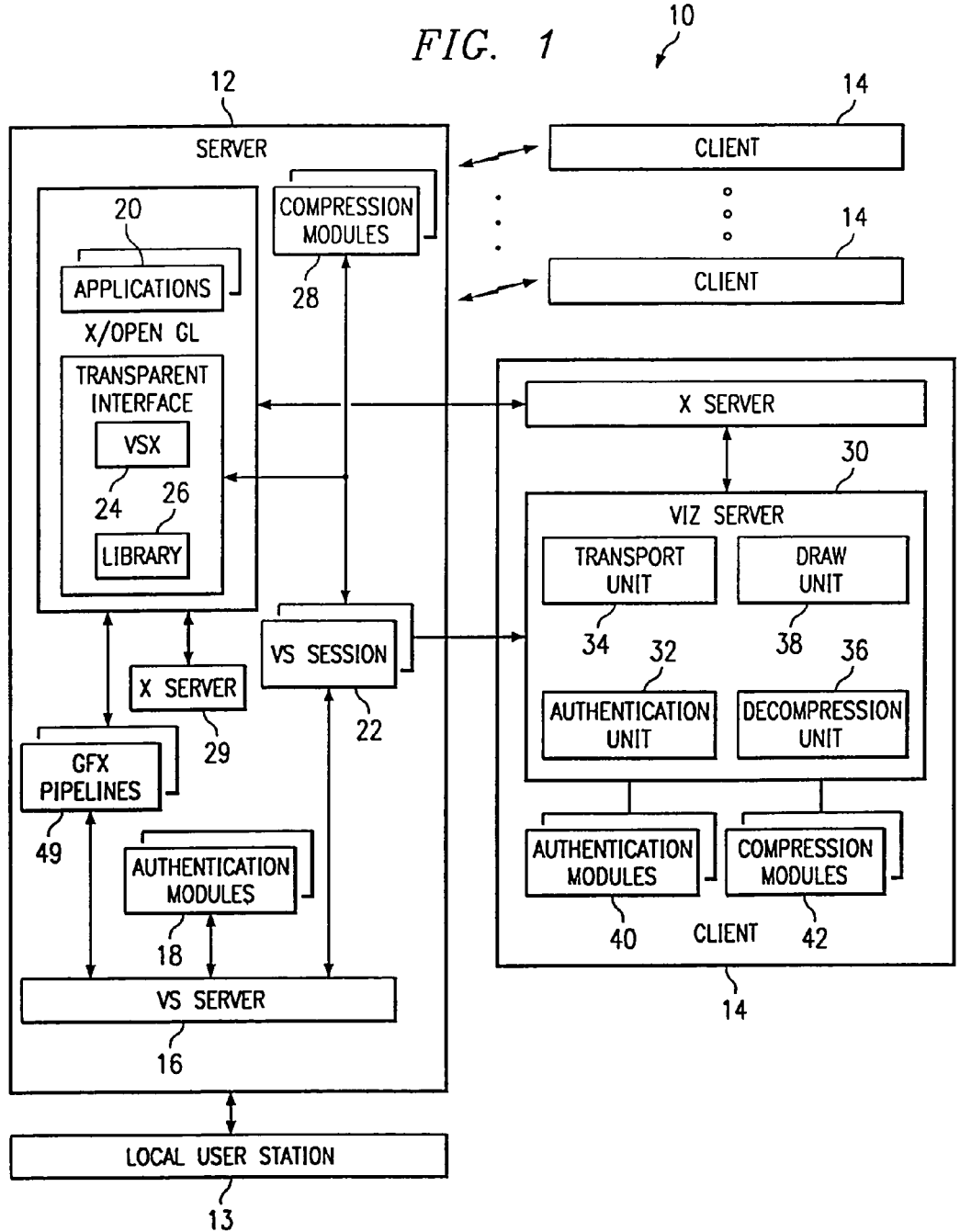
FIG. 1 illustrates a block diagram of a visual server system.

FIG. 1 is a block diagram of a visual server system 10. Visual server system 10 includes a server 12, a local user station 13, and one or more remote clients 14. Server 12 supports multiple simultaneous users with each user potentially running multiple applications. Server 12 takes image content and additional information regarding the position of that content and uses one or more protocols to stream the image content and additional data to a number of remote locations over a network link. The image content is generated by a single source and may be generated based on dynamic input parameters from the remote locations. Moreover, remote clients 14 may provide data which can be considered as prospective data for the dynamic input parameters on which the image content is based. Server 12 provides input control of data received from clients 14 to determine which one or more sets of prospective data will or will not be provided to the source of the image content.

Global information about users and server resources is managed by a single instance of server software vsserver 16. Vsserver 16 dynamically loads authentication modules 18 to verify any user requesting a connection. Graphics pipelines 19 provide the images generated by applications 20. Applications 20 are run by a user during a session. Each session is managed by its own instance of session software vssession 22. With multiple users, there may be several copies of vssession 22 running concurrently. Vssession 22 communicates with a transparent executable vsx 24 and a library 26. Transparent interface executable vsx 24 and library 26 intercept images from applications 20 and dynamically loads compression modules 28 required for the session. Compressed images are delivered to client 14 by vssession 22. Server 12 may implement an x protocol through an x server 29.

Applications 20 is the single source of image and positioning data for streaming to clients 14. The image data is displayed at clients 14 to enable each remote user associated therewith to see and interact with applications 20 on their workstation. Remote users at clients 14 may provide inputs to adjust the image data being displayed. Server 12 determines which user inputs have the ability to control the image data and supplies those inputs to applications 20 as input parameters. For example, a pair of seismological experts, one located in London and the other located in Houston, may wish to see and interact with a single visual application associated with seismic data of an area possibly rich in oil. Through network connection with server 12, which may be co-located with either the London or Houston seismologist or geographically remote from London and Houston, each seismologist may work together interactively on the image data being viewed at the same time. The seismologists are able to share the same application 20 even though the application 20 is not located locally on either of their workstations. Visual server system 10 provides a collaborative feature to accomplish such tasks.

Collaboration may also occur between local user station 13 and one or more clients 14. Local user 13 has direct access to server 12 while clients 14 have a network access to server 12. Local user station 13 can work together with a client 14 on an application 20 started in server 12 by sharing that application 20. Local user station 13 can log into server 12 with input control and start a collaborative session. A remote client 14 may then join the session. Input control may be passed between local user station 13 and client 14. The party that does not have input control may have its inputs blocked by server 12. When a party with input control interacts with application 20, that interaction is updated on the other party's display so that all parties have the same view of application 20.

A single interaction between server 12 and a client 14 may take place over two separate network connections. One network connection may be used for image data and the other network connection may be used for user interface data. Image data is sent by vssession 22 to client 14 on a one way network connection. User interface data is transmitted on a two way network connection between server 12 and client 14. User interface data is unmodified remote commands using an X protocol from applications 20. User inputs are sent from client 14 to server 12. User interface widgets and primitives are sent from server 12 to client 14.

Client 14 connects to server 12 through a client executable vizserver 30. Vizserver 30 has four major components—authentication component 32, image transport component 34, decompression component 36, and image draw component 38. Authentication component 32 dynamically loads client side authentication modules 40. Image transport component 34 reads images from server 12. Decompression component 36 dynamically loads client side compression modules 42. Image draw component 38 inserts decompressed images into proper X protocol windows at client 14. Applications 20 may be run on server 12 and displayed at client 14 after client 14 has connected to server 12 and a session has been established.

Visual server system 10 supports application transparent image based remote rendering by virtualizing displays using the X protocol, windows, and visuals and GLX rendering contexts. Visual server system 10 diverts OpenGL commands from a GLX application stream to the hardware accelerator of server 12 while letting the X protocol transport all user input, window, and widget information directly to remote clients 14. Images rendered on server 12 are captured, compressed, and transported to client 14. Client 14 decompresses the images and embeds them in the appropriate windows maintained by the X protocol. Visual server system 10 relies on the X protocol and GLX support on both server and client 14. Visual server system 10 enables unmodified GLX based applications to run on a remote system yet appears as if they were running locally. This includes properly rendering any number of OpenGL contexts and windows and fully supporting all user input, widgets, and user interface data.

Visual server system 10 provides complete transparency to enable applications to run unmodified and be remotely displayed. Unmodified user interfacing is delivered to client 14 so that applications appear as if the applications are running locally. Visual server system 10 includes high performance image based capture and transmission techniques of interactive graphics streams supporting third party compression modules as plug in devices. Applications 20 may depend only on the capabilities of server 12 and not on client 14. Multiple users are supported with simultaneous access of different server 12 resources, including graphics pipelines 19, along with support for any number of simultaneous graphics contexts and windows. Visual server system 10 also provides a robust security model to enable third parties to utilize their own authentication mechanisms as plug in devices. Moreover, image data is provided on a different network connection than user interface data.

Visual server system 10 preferably operates with high end machines in server 12 for graphics scalability, high image capture rates, and processor scalability. However, clients 14 are not so restricted as visual server system 10 provides for thin client operation where server 12 provides the bulk of the processing. The image data and user interface data connections preferably use the TCP/IP standard.

Though shown with specific components and processes, visual server system 10 is basically divided into a client, a server, and a session manager. The behavior between the client and the server is arbitrary and can incorporate any desired design techniques. An authentication scheme may be provided as well as any mechanism for starting a session. A session may be started by the server with optional execution of a session script. When a user at a client starts an application, the application picks up the runtime library through the runtime linker. The runtime library need not be bound to the runtime linker as its functionality could be incorporated into the base level libraries that an application links against. The runtime library then connects with the session manager and the client. User interface elements of the application are sent along a bi-directional link or channel to the client. The user interface elements can be in any protocol as desired by the designer such as for example X windows, Citrix ICA, or some image based hybrid including VNC or DC-Share. For discussion purposes, the X protocol is used herein for describing one embodiment of the present invention. Graphics windows are sent to the client on a unidirectional link or channel separate from the bi-directional link or channel used for the user interface elements.

Figure 2:
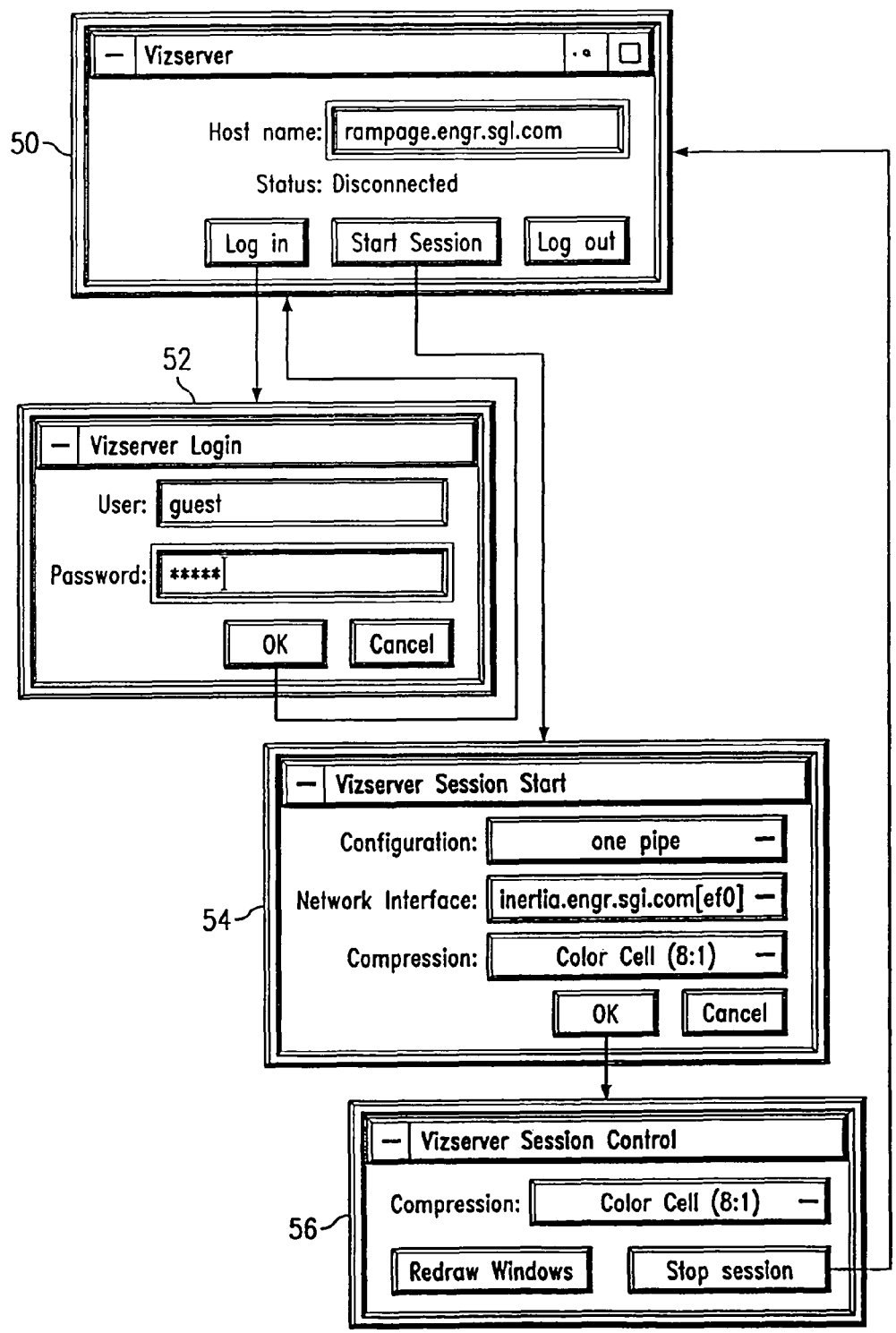
FIG. 2 illustrates interface windows provided to a client/remote user in the visual server system.

In operation of one embodiment of visual server system 10, vsserver 16 may run as a root owned daemon process on server 12 analogous to an HTTP daemon for web servers. On start up, vsserver 16 queries server 12 for available graphics resources, such as graphics pipelines 19, to manage. Vsserver 16 then listens on a static network port for client connections. A connection is initiated using vizserver 30 from a client 14. An example of the user interface hierarchy is shown in FIG. 2. When a user at client 14 logs in through a connection window 50, vizserver 30 connects to vsserver through the known static network port and authentication is initiated.

When a connection is established between server 12 and client 14, vsserver 16 and vizserver 30 dynamically load respective server authentication modules 18 and client authentication modules 40 as specified in a configuration file in server 12. After valid authentication modules are loaded, vizserver 30 presents an authentication window 52 through authentication component 32 with fields for the corresponding authentication mechanism. Visual server system 10 supports password authentication by default where user and password fields are displayed in authentication window 52. Upon successful authentication, a user is logged into server 12 and visual server system 10.

Authentication modules 40 may be created by third parties through an authentication application programmable interface. The authentication application programmable interface may be a C++ class based interface having an authentication container that holds an authentication context and authentication fields. The authentication context performs the actual work involved with authentication including data transfer to and from client 14 and the query mechanism associated with authentication module 40. Authentication fields are textual representations of the items necessary for user authentication. The modularity of authentication modules supports a full range of authentication styles including Kerberos and DCE.

When a user chooses to begin a new session, vizserver 30 displays a series of options in a session start window 54. The user may specify a number of graphics pipelines to allocate for the session, an initial compression type, and a client network interface over which images may be sent. At session start, vsserver 16 allocates the requested number of graphics pipelines 19 from those that are unused and then moves to a new process owned by the user. This new process executes vssession 22 on server 12. Vssession 22 establishes two connections to vizserver 30. The first connection is a command connection on a default channel and an image data connection on a user specified channel. Vssession 22 initializes the allocated graphics pipelines on server 12 and calls a server side/ usr/vizserver/bin/session script. This script may execute any sequence of commands when the session starts.

After the session script is executed, vizserver 30 presents a session control window 56. Session control window 56 displays runtime configuration parameters of visual server system 10. The user may change the image compression algorithm used by visual server system 10 at any time to enable a moment by moment tradeoff between frame rate and image quality. Session control window 56 also provides a button for the user to stop the session. When a session is ended, vssession 22 is terminated, server resources are returned to an unused state, and vizserver 30 returns to session start window 54 to await another session start request.

Once a session has been established, a user can launch applications 20 on server 12 using transparent executable vsx 24. By prefixing the vsx command to any usual application command line, GLX applications 20 may be run through vizserver at client 14. Preferably, the invocation of transparent executable vsx 24 is hidden from the user at client 14 through the session script. The default session script displays a terminal window on the client to run an interactive shell that has been launched with transparent executable vsx 24. This enables the user to enter any commands without having to explicitly preface them with a vsx command. Alternatively, the session script could present at client 14 a suite of applications with a menu bar hiding the use of transparent executable vsx 24. The session script may place an icon on the desktop of client 14 that invokes transparent executable vsx 24 on a particular application. The session script may also launch a pre-defined application with transparent executable vsx 24. Using transparent executable vsx 24, images may be captured, compressed, and transferred to client 14. Without transparent executable vsx 24, only graphics state and primitives are sent to client 14.

Applications 20 are unaware that visual server system 10 is rendering images on server 12 and transmitting those images to client 14. This application transparency is achieved by intercepting key X, GLX, and OpenGL function calls made by applications 20. Library implements its own versions of these function calls resolves them through a run time linker when library 26 is wedged between applications 20 and other system libraries. The overall performance impact to an application from transparent library 26 is negligible as most system library functions are not intercepted.

Visual server system 10 does not abstract user interface widgets or events. Instead, the remote X protocol handles the display of widgets and the trapping of user interaction events. Visual server system 10 virtualizes X displays, X windows, and X visuals as it tracks them on both server 12 and client 14. Visual server system 10 dynamically defines server display numbers so it may coexist with X server 29. A default configuration starts at a certain display number and increments based on the number of displays and graphics pipelines 19 on server 12 as well as the number of active sessions. The identifier of the display on client 14 is returned to application 20 as within normal remote X rendering. Visual server system 10 virtualizes a window when an OpenGL context is bound to the window. In this case, visual server system 10 creates two actual windows, one on server 12 and one on client 14. The window on server 12 is used for accelerated rendering and is the source of images for client 14. The identifier of the window at client 14 is returned to application 20 as with normal remote X rendering.

Virtualization of visuals is more complicated than that of displays and windows because server 12 and client may support different visuals. In addition, it is desirable to take advantage of attributes of server 12, such as multi-sampling, that are not present on client 14. Care is necessary when performing a visual match between server 12 and client 14 because visual server system 10 has no knowledge that a window-visual combination will be used for OpenGL rendering until an OpenGL context is made current. Applications 20 may be requesting visuals for X pixmap operations or user interface widgets, both of which occur on client 14, or for GL rendering, which occurs on server 12. Visual server system 10 iterates over a list of visuals for server 12 and matches each one to a visual at client 14 based on visual class (e.g. Pseudo-Color or TrueColor), buffering (e.g. single buffer or double buffer), and stereo. Differences in color depth, for instance where client 14 has 15 bit RGB and server 12 has 48 bit RGBA, are not a concern because the color can be reformatted on either server 12 or client 14 during image capture or image draw. If the visual class, buffering, and stereo features are compatible, the visual at server 12 and the visual at client 14 are recorded and the pair is assigned a virtual visual identifier. When application 20 selects a visual for client 14, the corresponding visual at server 12 is used for the window at server 12 and the appropriate virtual visual identifier is returned to application 20.

Table 1 shows the X system library function calls that library 26 overrides to virtualize displays, windows, and visuals. Library 26 overrides all X function calls that use a visual identifier since library translates its virtual visual identifiers into the proper identifiers for server 12 and client 14. Function calls that require only display or window identifiers need not be overridden as they are identical to unmodified X identifiers.

TABLE 1

| | |
|---|---|
| XOpenDisplay | XCloseDisplay |
| XCreateWindow | XDestroyWindow |
| XCreateImage | XCreateColormap |
| XSetRGBColormaps | XGetRGBColormaps |
| XMoveWindow | XResizeWindow |
| XSync | XFlush |
| XGetWindowAttributes | XChangeWindowAttributes |
| XSetWindowBorderWidth | XSetWindowColormap |
| XGetVisualInfo | XMatchVisualInfo |
| XListExtensions | XFreeExtensionList |
| XEventsQueued | XPending |
| XCheckWindowEvent | XCheckTypeWindowEvent |
| XConfigureWindow | XWindowEvent |
| XPeekEvent | XNextEvent |
| XMaskEvent | XCheckMaskEvent |
| XQueryExtension | XSelectInput |
| XSetErrorHandler | |

Visual server system 10 virtualizes OpenGL rendering contexts in order to manage contexts on both server 12 and client 14. Visual server system 10 renders on server 12 when a main color plane visual is selected. Overlay and underlay plane rendering is performed at client 14. When a context is created for an overlay or underlay plane, normal GLX requests are sent to client 14. When a main color plane is selected, no action is performed and a virtual context identifier is created and returned to application 20. When a virtual context is first bound to a drawable, actual rendering contexts are created at client 14, where the image is to be displayed, and at server 12, where the image is to be rendered. Subsequent operations that use the virtual context identifier are translated by virtual server system 10 into the appropriate actions at either client 14 or server 12. This rendering context virtualization enables multiple rendering contexts and multiple applications to be run transparently and concurrently. Since GLX is by definition the set of extensions to the X protocol to associate OpenGL rendering contexts with the X protocol, library 26 overrides the system library GLX function calls.

OpenGL does not have a frame based interface so it is not possible to know precisely when an application 20 is expecting an updated frame. Visual server system 10 assumes that it needs to update a frame upon a buffer swap or a flush of the graphics pipeline 19. Applications 20 that do not perform these function calls will not receive updates on client 14. Visual server system 10 changes the semantics of the trigger functions under certain conditions. When a user at client 14 switches to a non-spoiling compressor in the image pipeline, the trigger functions block the application 20 until a frame is sent to client 14. The unacceptable alternative is to allow frames to build up internally in server 12 indefinitely, creating severe memory problems. Library 26 overrides buffer swap, flush, finish, and wait function calls in order to trigger an image capture.

Figure 3:
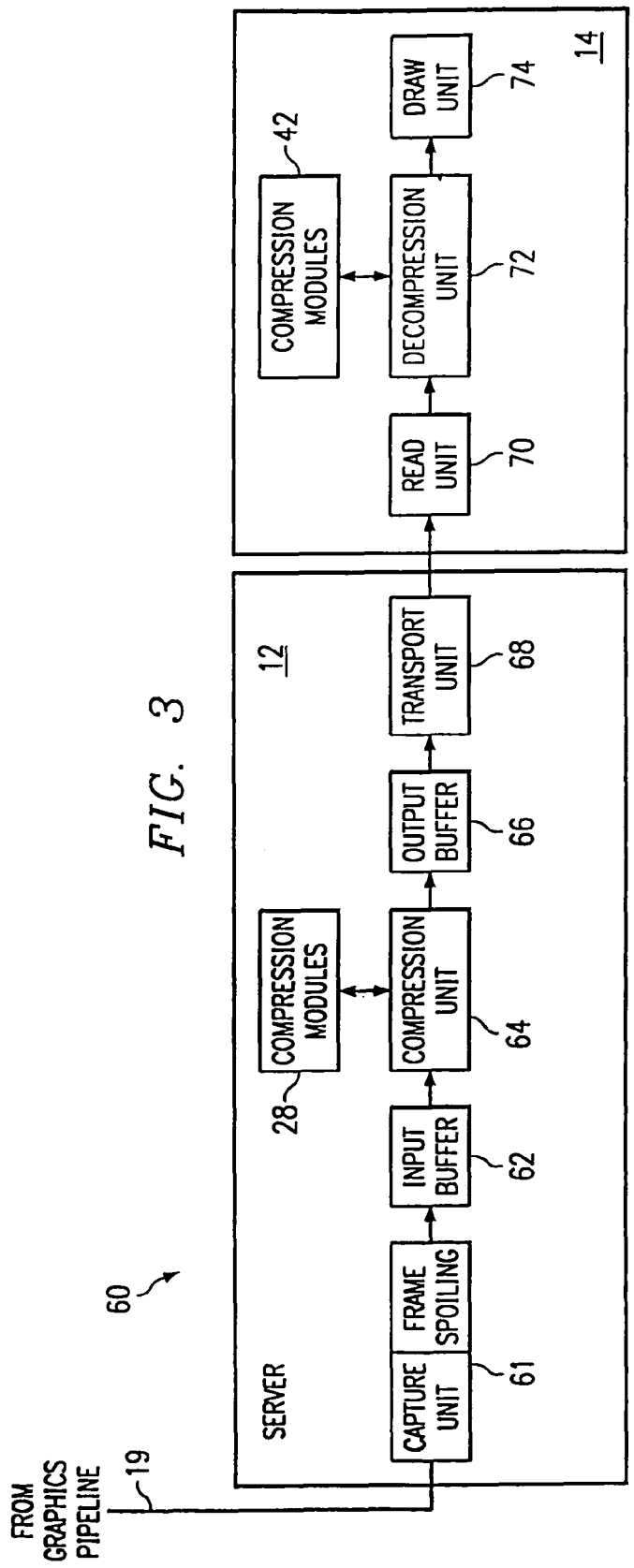
FIG. 3 illustrates a block diagram of an image pipeline in the visual server system.

FIG. 3 is a block diagram of an image pipeline 60 in visual server system 10. Server 12 includes a capture unit 61, an input buffer 63, a compression unit 64, an output buffer 66, and a transport unit 68 all controlled by vssession 22. Client 14 includes a read unit 70, a decompression unit 72, and a draw unit 74. A frame spoiler 62 may be part of or separate from capture unit 61. The image pipeline 60 performs capture, transmission, and display of images when library 26 intercepts an OpenGL or GLX function call that signifies a frame boundary. Images are captured from the current graphics context and inserted into input buffer 63 before being compressed. Compressed images are placed into output buffer 66 before being sent over the network link to client 14 for display.

For image capture, capture unit 61 obtains final rendered frames through software capture of frame buffer contents in server 12. Image capture is performed by inserting a capture OpenGL command on the current window with the appropriate OpenGL pixel state and transfer modes set. Server 12 uses its own capture context to maintain the necessary state, switch to that context for the image capture, and restore the context of application 20 when done. No significant performance benefits occur from shadowing the application pixel state and performing the image capture in the application context. Image capture blocks the graphics pipeline 19 until the image data is delivered to capture unit 61. This may cause a potential performance bottleneck that may be avoided with hardware capture using a graphics video output board and a digital video input board combined in a loop back to server 12.

The main bottleneck in image pipeline 60 is the network link between server 12 and client 14. Without some intervention, rendered frames would accumulate without bound on server 12. By default, server 12 discards some image frames in a mechanism known as frame spoiling. Frame spoiling is a means of controlling the stream of images updates that reach client 14 across the network link. Frame spoiling allows for application 20 to run in real time while still being able to scale well across low bandwidth network links and maintain an interactive capability. Image updates are dropped if the network link reaches its limit, allowing the most recently generated updates to reach client 14 in finite low latency time. Allowing the most recent image updates to be sent reduces the amount of traffic across the network link.

Vssession 22 determines whether a frame should be spoiled based on available space in both input buffer 63 and output buffer 66. If space is available, the frame is added to input buffer 63. If there is no available space, the frame is discarded. This determination is performed prior to the image data being sent to compression unit 64. Images are spoiled when the bandwidth of the network link and input buffers 63 and output buffers 66 can no longer support the rate at which image frames are entering the network transmission phase. Since this ties the image update capture with the network transmission, the frame spoiling feature can be moved from its conventional location at compression unit 64 of image pipeline 60 to capture unit 61. By checking the pipeline queue and spoiling images before compression, compression unit 64 need not be aware of the absence of an image frame whether interframe or static compression is in place. Since the spoiled image frame is not included in the calculations of the next image update to client 14 in an interframe compression scheme, no errors in calculation will be seen between compression unit 64 and decompression unit 72 at client 14. In this manner, valuable processor time is not wasted on compressing an image frame that may be subsequently discarded. By performing frame spoiling first, compression will only occur on those image frames that are always sent to client 14.

Sizes for input buffer 63 and output buffer 66 are fixed during run time but are configurable at start up. Deeper buffers do not decrease spoiling when visual server system 10 is in steady state but they do increase latency. Because potentially valuable information may be lost by frame spoiling, the frame spoiling feature may be disabled. When the frame spoiling feature is disabled, capture unit 61 blocks application 20 until input buffer 63 and output buffer 66 have enough space for another frame.

Input buffer 63 may provide an input indication to inform frame spoiler 62 that input buffer 63 is congested. The input indication may be generated based on a fill level of input buffer 63 anytime the fill level of input buffer 63 exceeds a desired threshold level. Similarly, output buffer 66 may provide an output indication to inform frame spoiler 62 that output buffer 66 is congested. The output indication may be generated based on a fill level of output buffer 66 anytime the fill level exceeds a desired threshold level. The desired threshold levels may be initially configured or adjusted as desired during runtime with the same or different threshold value. Frame spoiler 62 may discard frames in response to either or both of input buffer 63 and output buffer 66.

Image pipeline 60 supports image compression through compression unit 64 and compression modules 28 which are loaded dynamically in a manner similar to authentication modules 18. As with authentication, server 12 and client both include compression modules 28 and 42. After authentication visual server system 10 creates a list of all valid server-client compression module pairs and presents that list in the session start window 54 and session control window 56. The user at client 14 may change the compression algorithm at any time during a session. Visual server system 10 may support no compression and color cell compression to provide low latency, display on a single CPU client without the client being the bottleneck, and ease of parallelization at server 12.

Visual server system 10 may also support interframe compression by storing previous frame data within the compression modules. Interframe compression is one of the best opportunities for improving overall performance. Interframe compression helps to reduce the amount of image data transmitted over the network link. Applying interframe compression helps increase real time user interactivity capabilities, image throughput, and image quality while maintaining higher compression ratios. Since most images change gradually, progressive transmission of only the needed image updates of an image is performed across the network link to reduce bandwidth, but it poses a challenge because of the non-static higher latency found in typical interframe compression algorithms.

Interframe compression allows for the removal of redundancy between image frames to effectively reduce traffic over the network link. Interframe compression performed in visual server system 10 adheres to a generic framework. Programmable compression modules are used to compress image data and transmit a whole frame across the network link. Since previous frame data is maintained within the compression modules, the compression modules may transmit any piece of image data as desired. The image data transmitted can be a collection of frames, a piece of a frame, or just a minor change between multiple image frames. The compression modules are capable of controlling what format the image data is in and how the images flow across the network link. In this manner, a small update can be sent to client 14 that results in a complete image frame being displayed at client 14.

Interframe compression is important within the realm of visual serving due to its ability to reduce network traffic, especially when server 12 collaborates with multiple clients 14. Custom made compression modules may be developed to deal with specific streams of images to reduce redundancy in the streams. With reduced network traffic, real time interaction becomes more viable. Client 14 is less affected by latency and can function as if application 20 was running locally.

Custom compression modules may be created through the use of an OpenGL compression application programmable interface. The compression application programmable interface is preferably a C++ class based interface that includes a frame data container and a compressor class. The frame data container holds the raw data of an image frame and any formatting information. The compressor class includes a compress method and an expand method. A frame data object is filled with image data that has been captured from the frame buffer and the compress method of the currently active compression module 28 is called. This data is eventually sent over the network link to client 14 where vizserver 30 calls the expand method of its local compression module 42 to obtain the frame data object.

Compression modules 28 and 42 are thus programmable to provide appropriate compression of a stream of image generated by application 20. By having multiple compression modules, different compression techniques and compression ratios may be implemented. Image streams sent to one or more clients may have different compression types, either within an individual stream of related images or between separately partitioned streams of images.

After compression, the image data is placed in output buffer 66. Transport unit 68 includes networking code to stream the image data from output buffer 66 to client 14 over the network link. All processing of image frames at client 14 occurs in a single thread in vizserver 30. Multiple threads reduced interactivity capabilities more than desired on single processor client workstations. Read unit 70 preferably has no buffer and thus reads a frame from the network link as often as it can. Decompression unit 72 dynamically loads the appropriate compression module 42 in order to expand the image data. Draw unit 74 draws the image on a display unit at client 14 according to the appropriate OpenGL rendering context.

In order to enhance user interaction, visual server system 10 employs a messaging scheme to control operation of compression unit 64 and decompression unit 72. The messaging scheme makes use of the programmability of compression modules 28 and 42 to appropriately compress and decompress image data. By controlling operation of compression unit 64 and decompression unit 72, tasks such as serving one stream of image data to multiple clients 14, multiple streams of image data to a single client 14, and multiple streams of image data to multiple clients 14 can be achieved. The messaging scheme addresses various problems that occur in a dynamic and heavily interactive environment provided by visual server system 10 including the ability to provide multiple streams of image data through a single compression unit 64 and decompression unit 72 in image pipeline 60, the ability to resize images, and the ability to terminate an image. When an event such as the ones above occur, visual server system 10 generates a message that is sent to compression unit 64 and decompression unit 72 to allow for changes in the compression and decompression task.

Three exemplary messages used within virtual server system 10 include a CreateNotify message, a ResizeNotify message, and a DestroyNotify message. The CreateNotify message signals the compression unit 64 and the decompression unit 72 that a new stream of image data will pass through. This will allow compression unit 64 and decompression unit 72 to generate any internal state changes or resources to handle the new stream of image data. The ResizeNotify message signals compression unit 64 and decompression unit 72 when image data is resized. This takes place before the resized image update passes through compression unit 64. Compression unit 64 and decompression unit 72 are then responsible for taking actions to recalculate any internal state and send any retranslated image updates for the new image size. The DestroyNotify message signals compression unit 64 and decompression unit 72 when an image and its stream of updates terminates. Compression unit 64 and decompression unit 72 removes any internal resources for the terminated image stream.

Other situations for general improvement or maintenance can also be added to the messaging scheme. The messaging scheme is open to new additions of message types as visual server system 10 evolves. The messaging scheme is thus a useful solution for existing and future problems. An alternative approach is to include the messaging function within compression unit 64 and decompression unit 72 so that there are no explicit messages being sent. Compression unit 64 and decompression unit 72 detect when appropriate actions should occur. This alternate approach is more free form and requires less effort but adds more responsibility to compression unit 64 and decompression unit 72, adds inefficiencies, and becomes less flexible. The messaging scheme removes responsibility from compression unit 64 and decompression unit 72 and simply allows them to react to the situation stated by the message wherein the reaction can be specific to each supported compression module.

In summary, visual server system 10 provides a high performance image based system for interactive distributed image rendering between a single server source to multiple remote clients. Unmodified GLX based applications, including their complete user interfaces, are delivered over a network link to remote clients. Visual server system 10 is designed around a thin client model which supports several platforms and enables applications to take advantage of graphics and system capabilities of a server that may not be present on any client. Virtual server system 10 is secure and extensible, allowing users to implement their own authentication and compression algorithms.

Thus, it is apparent that there has been provided, in accordance with the present invention, title that satisfies the advantages set forth above. Although the present invention has been described in detail, various changes, substitutions, and alterations may be herein. For example, though an exemplary system has been described herein, different implementations and mechanisms may be incorporated while still providing the basic functional concept. Other examples may be readily ascertainable by those skilled in the art and may be made herein without departing from the spirit and scope of the present invention as defined by the following claims.

What is claimed is:

1. A system for providing collaboration of a graphics session, comprising;
   a visual server operable to provide graphics images through execution of a graphics application;
   a local terminal operable to interact with the graphics application in response to possession of input control;
   a remote terminal operable to interact with the graphics application in response to possession of the input control, the input control operable to be passed between the local terminal and the remote terminal, wherein the input control is passed from the local terminal to the remote terminal in response to an input to the graphics application by the local terminal; wherein the local terminal is operable to interact with the graphics application when in possession of the input control, the interaction performed by the local terminal being visible at the remote terminal; wherein inputs to the graphics application made by the remote terminal are blocked by the graphics application in response to the remote terminal not having the input control.

2. The system of claim 1, wherein the local terminal and the remote terminal have identical views of the graphics application provided by the visual server regardless of whether the local terminal or the remote terminal possesses the input control.

3. The system of claim 1, wherein the local terminal and the remote terminal are operable to access the graphics application and view graphics images in a collaborative session.

4. The system of claim 3, wherein the local terminal initiates the graphics application, the local terminal operable to initiate a collaborative session with the remote terminal.

5. The system of claim 1, wherein the remote terminal is operable to interact with the graphics application when in possession of the input control, the interaction performed by the remote terminal being visible at the local terminal.

6. The system of claim 5, wherein inputs to the graphics application made by the local terminal are blocked by the graphics application in response to the local terminal not having the input control.

7. The system of claim 1, wherein the input control is passed from the local terminal to the remote terminal upon relinquishment of the input control by the local terminal.

8. A method for providing collaboration of a graphics session, comprising: providing a graphics application at a visual server; initiating the graphics application at a local terminal;
   initiating a collaborative session between the local terminal and a remote terminal;
   interacting with the graphics application at the local terminal in response to possession of input control;
   providing results of local terminal interaction with the graphics application to the remote terminal;
   passing the input control from the local terminal to the remote terminal in response to an input to the graphics application by the local terminal; wherein the local terminal is operable to interact with the graphics application when in possession of the input control, the interaction performed by the local terminal being visible at the remote terminal; wherein blocking remote terminal interaction with the graphics application in response to the remote terminal not possessing the input control.

9. The method of claim 8, further comprising:
   interacting with the graphics application at the remote terminal in response to possession of the input control;
   providing results of remote terminal interaction with the graphics application to the local terminal.

10. The method of claim 8, further comprising:
    providing an identical view of the graphics application to both the local terminal and the remote terminal.

11. An apparatus for providing collaboration of a graphics session, comprising:
    a server machine including:
    a graphics application processor operable to provide graphics images;
    a server application processor operable to provide access to the graphics application by a local terminal;
    a session application processor operable to provide access to the graphics application by a remote terminal, wherein an identical view of the graphics application is provided to both the local terminal and the remote terminal through the server application and the session application respectively, the server application operable to permit the local terminal to interact with the graphics application in response to possession of input control, the session application operable to permit the remote terminal to interact with the graphics application in response to possession of the input control, the server application and the session application operable to pass the input control between each other to allow the local terminal and the remote terminal to collaborate with the graphics application, wherein the input control is passed from the server application to the session application in response to an interaction with the graphics application by the local terminal; wherein interactions with the graphics application processor by the local terminal in response to the server application processor having the input control are provided to the remote terminal; wherein interactions with the graphics application processor by the remote terminal are blocked when the session application processor does not have the input control.

12. The apparatus of claim 11, wherein the server application processor is operable to initiate the graphics application processor in response to a request from the local terminal, the server application processor operable to establish a collaborative session with the session application processor to allow remote terminal interaction with the graphics application processor in conjunction with local terminal interaction with the graphics application processor.

* * * * *